(12) United States Patent
Gaskell et al.

(10) Patent No.: US 7,911,674 B2
(45) Date of Patent: Mar. 22, 2011

(54) ELECTROCHROMIC DEVICES AND METHODS FOR PATTERNING SUCH DEVICES

(75) Inventors: Drew Gaskell, Santa Rosa, CA (US); Peter Egerton, Windsor, CA (US)

(73) Assignee: Soladigm, Inc., Milpitas, CA (US)

( * ) Notice: Subject to any disclaimer, the term of this patent is extended or adjusted under 35 U.S.C. 154(b) by 256 days.

(21) Appl. No.: 12/345,638

(22) Filed: Dec. 29, 2008

(65) Prior Publication Data

US 2010/0165439 A1     Jul. 1, 2010

(51) Int. Cl.
*G02F 1/15*     (2006.01)
(52) U.S. Cl. ..................... 359/265; 427/108
(58) Field of Classification Search .............. 359/265, 359/245, 238; 427/108, 576
See application file for complete search history.

(56) References Cited

U.S. PATENT DOCUMENTS

| | | | |
|---|---|---|---|
| 6,337,758 B1 | 1/2002 | Beteille et al. | |
| 6,529,308 B2 | 3/2003 | Beteille et al. | |
| 2009/0237820 A1* | 9/2009 | McCabe et al. | 359/839 |

OTHER PUBLICATIONS

M. Burdis et al., "Focused R&D for Electrochromic Smart Windows: Significant Performance and Yield Enhancements," DE-FC26-01NT41259, Sep. 23, 2004, pp. 1-76.
C.M. Lampert, "Toward large-area photovoltiac nanocells: experiences learned from smart window technology," Solar Energy Materials And Solar Cells 32 (1994) pp. 307-321.
O. Yavas et al., "Effect of substrate absorption on the efficiency of laser patterning of indium tin oxide thin films," Journal of Applied Physics, vol. 85, No. 8, Apr. 15, 1999, pp. 4207-4212.

* cited by examiner

*Primary Examiner* — Timothy J Thompson
(74) *Attorney, Agent, or Firm* — Joseph P. Curtin, L.L.C.

(57) ABSTRACT

Varying the optical absorption of an electrochromic device in situ allows optimal control over the depth and quality of laser patterning lines when patterning electrochromic devices. Accordingly, an electrochromic device comprises a target conductive layer, an absorbing electrochromic layer formed below the target layer, and an electrolyte layer formed below the absorbing electrochromic layer. The absorbing electrochromic layer is placed in a darkened state, and the target layer is laser ablated using a wavelength that is minimally absorbed in the target layer and a fluence level that does not ablate layers of the electrochromic device that are below the absorbing electrochromic layer. The absorbing electrochromic layer is placed in the darkened state by applying a predetermined control voltage to the electrochromic device, forming the electrochromic device by dark-state deposition, or forming an electrochromic device that is in its darkened state in an equilibrium state.

18 Claims, 6 Drawing Sheets

ELECTROCHROMIC DEVICES AND METHODS FOR PATTERNING SUCH DEVICES

BACKGROUND

The field of electrochromics is extensive and has been developing over about the last forty years. In one application, an electrochromic coating is used for controlling the amount of light and heat passing through the window based on a user-controlled electrical potential that is applied across the optical stack of the electrochromic coating. An electrochromic coating can reduce the amount of energy used for room heating and/or air conditioning, however this energy benefit is dependent on the efficiency of the electrochromic device. By switching between a clear state having an optical transmission of about 60-80% and a colored state having an optical transmission of between 0.1-10%, both energy flow into a room through a window and privacy provided by the window can be controlled. The amount of glass used for various types of windows, such as skylights, aircraft windows, residential and commercial building windows, and automobile windows, is on the order of one billion square meters per year. Accordingly, the potential energy saving provided by electrochromic glazing is substantial. See, for example, Solar Energy Materials and Solar Cells, (1994) pp. 307-321.

A conventional electrochromic cell generally is structured as follows: a substrate, a transparent conductive layer, a counter electrode, an electrolyte, an electrochromic layer, and a transparent conductive layer. Conventional cathodic materials, commonly referred to as "electrochromic electrodes," have included tungsten oxide $WO_3$ (most common), molybdenum oxide $MoO_3$, niobium oxide $Nb_2O_5$, among others. Anodic materials, commonly referred to as "counter electrodes," include nickel oxide NiO, tungsten-doped nickel oxide, and vanadium oxide ($V_2O_5$), among others. The electrolyte materials exhibit poor electron conduction, but good ion conduction. Examples of ion layer materials include silicon dioxide $SiO_2$, titanium oxide $TiO_2$, aluminum oxide $Al_2O_3$, and tantalum oxide $Ta_2O_5$.

Various types of transparent conducting thin films have been employed for the first and second transparent conducting layers, such as, indium tin oxide (ITO), which is the most commonly used material. Other thin oxide layers have also been used, such as fluorine-doped tin oxide, antimony-doped tin oxide, aluminum-doped zinc oxide, and fluorine-doped zinc oxide. Regardless which thin film is used, conductivities of less than about 20 Ohms/□ are needed in order to produce a uniform voltage between the two conductive layers across the conductive layers.

At the anode, the following reaction takes place:

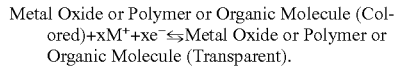
Metal Oxide or Polymer or Organic Molecule (Colored)+$xM^+$+$xe^-$⇌Metal Oxide or Polymer or Organic Molecule (Transparent).

At the cathode, the following reaction takes place:

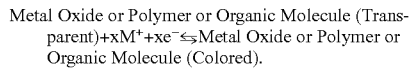
Metal Oxide or Polymer or Organic Molecule (Transparent)+$xM^+$+$xe^-$⇌Metal Oxide or Polymer or Organic Molecule (Colored).

in which M is $H^+$, $Li^+$ or $Na^+$, e is an electron, and x is an integer.

In operation, a voltage of between −5 and +5 volts is applied between the first and second conducting layers and causes reversible migration of ions between the anode and cathode resulting in the above oxidation-reduction reactions that change the absorption of the cathode, anode, or both. The electrolyte conducts ions between the materials. In a device without shorting in the electrolyte between the two conductive layers, the device resistance is high and is primarily due to the resistance of the electrolyte.

Laser irradiation is capable of ablating materials by several mechanisms, with the primary mechanism being thermal vaporization. Each material has a different ablation threshold for each wavelength of laser light. The ablation threshold is a function of material properties and absorption of the wavelength used. Ablation threshold and fluence are described in units of energy per unit area. In order to adjust the fluence, the power output of the laser, the duration of the exposure, and/or the spot size of the incident light can be controlled. To adjust the duration of exposure, the speed of the laser scribe process can be adjusted. In the case of pulsed lasers, the repetition rate and pulse width can also control the duration of laser light exposure. Due to these attributes of laser processing, reducing the ablation threshold reduces the fluence for a desired process, thereby permitting the process to be performed using less energy, at a faster scribe speed, or both. This is a desirable situation for processing speed and process costs.

BRIEF DESCRIPTION OF THE DRAWINGS

The subject matter disclosed herein is illustrated by way of example and not by limitation in the accompanying figures in which like reference numerals indicate similar elements and in which.

DETAILED DESCRIPTION

The word "exemplary" is used herein to mean "serving as an example, instance, or illustration." Any embodiment described herein as "exemplary" is not to be construed as necessarily preferred or advantageous over other embodiments.

Patterning the materials of an electrochromic device increases the efficiency of the device. Moreover, patterning the transparent conductors in an electrochromic device is the most cost-effective way for preventing shorts between conductive layers, and for maintaining efficiency in areas where the first and second conductive layers may come in contact, or where the electrolyte is ineffective.

Figures 1A, 1B:
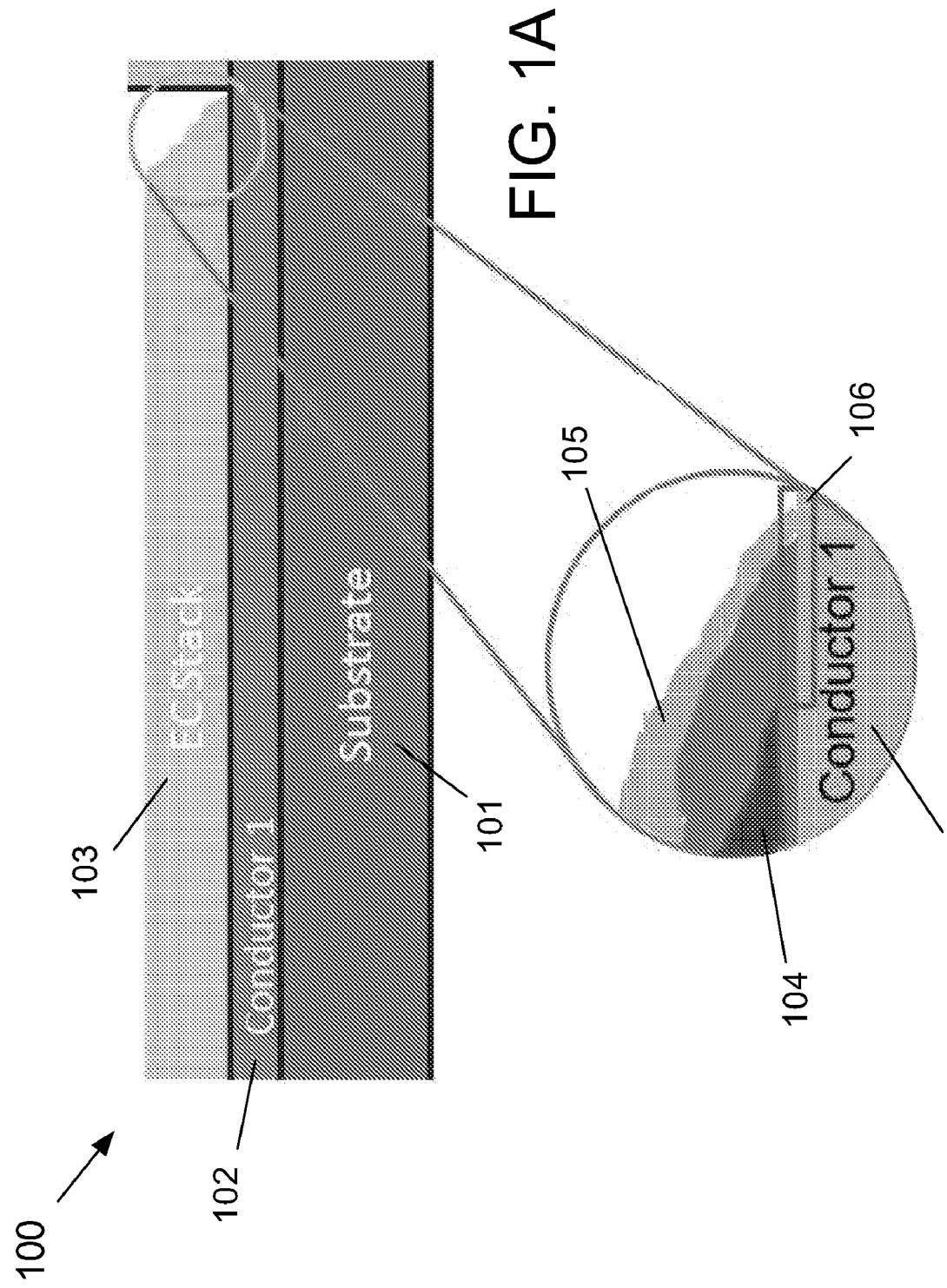
FIGS. 1A and 1B depict the mechanism that can cause shorting of the layers of an electrochromic device.

FIGS. 1A and 1B depict the mechanism that can cause shorting of the layers of an electrochromic device. In particular, FIG. 1 depicts an exemplary embodiment of an electrochromic device 100, such as a smart window, that comprises a substrate 101, a conductor 102 and an electrochromic stack 103. FIG. 1B depicts an enlarged view of electrochromic device 100 in a region that electrolyte 104 exhibits coating roll-off and can be insufficient for preventing conductor 102 and a conductive layer 105 from coming into contact and shorting in the region indicated by 106. The coating roll-off of electrolyte 104 can also cause an unpredictable resistance across the edge of electrochromic device 100. Accordingly, it is necessary to pattern conductive layer 105 to prevent shorts and to provide a predictable resistance across the edge of an electrochromic device.

Patterning of conductive layer 105 has been accomplished by physical patterning techniques and by laser-ablation techniques that use laser light of many different wavelengths. Three problems occur when patterning an electrochromic device using laser ablation. First, there is an inability to control the depth of the ablation due to the transmission of the laser light of commercially available lasers through the layers of the electrochromic device. Second, when using a laser having a wavelength within the transmission range of an electrochromic device, transmission of lower energy light (i.e., laser light having an energy below the ablation threshold) to lower layers in an electrochromic stack produces large amounts of slag around an ablation scribe line. Third, the capital and maintenance costs are high for commercially available lasers that can efficiently scribe materials that are transparent at visible and near infrared (IR) wavelengths.

Additionally, when patterning an electrochromic device by laser ablation, the melt of materials for incident energy that is below the ablation threshold can be distributed to the surrounding areas by vaporization of other materials. Laser light transmitted through the conducting layer of the electrochromic device can cause melting or vaporization of layers under the ablation target layer and/or damage to the substrate, thereby interrupting device operation by damaging both conductors. Additionally, a large kerf of undesirable material could be formed on the sides of the ablation scribe.

According to the subject matter disclosed herein, patterning an electrochromic device while an absorbing electrochromic layer of the electrochromic device is in a darkened state can increase the temperature-to-fluence efficiency and protect layers that are not targeted for ablation in the process, thereby allowing laser-ablation scribing to a specific depth in an electrochromic stack. This approach also provides a lower energy cost for the patterning process, which in turn minimizes the amount of melt at an ablation site and reduces the eject and slag in the area around a laser ablation scribe line. Further, a larger process window is enabled.

Moreover, the subject matter disclosed herein pertains to use of any laser having a peak wavelength in the region that an electrochromic device is capable of variable absorption. For window construction, this wavelength range is from visible light to near infrared. Additionally, the subject matter disclosed herein pertains to any technique of darkening an absorption layer in an electrochromic device.

Figure 2:
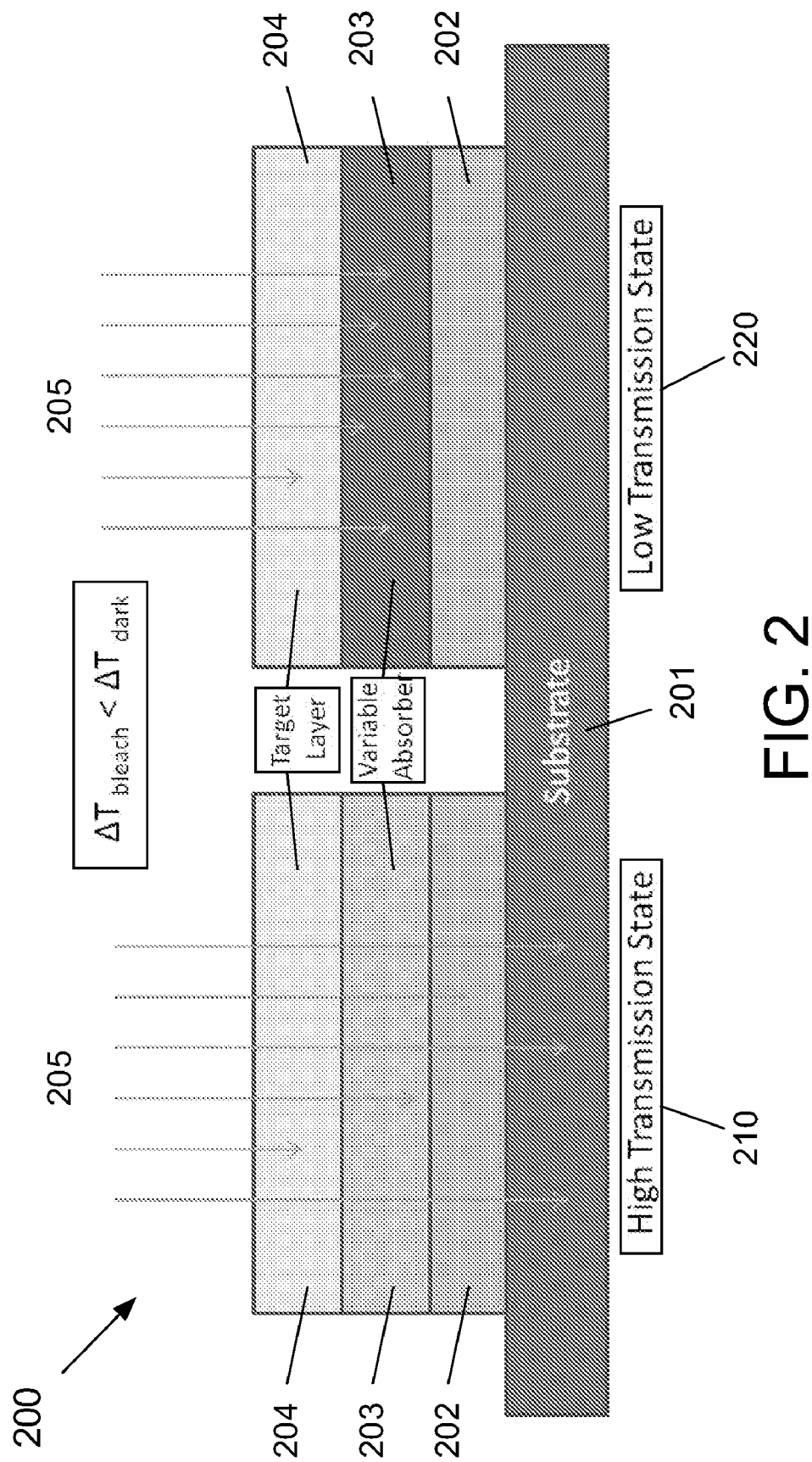
FIG. 2 depicts a cross-sectional elevation schematic view of two portions of an exemplary embodiment of an electrochromic device according to the subject matter disclosed herein for a high-transmission state and a low-transmission state.

FIG. 2 depicts a cross-sectional elevation schematic view of two portions of an exemplary embodiment of an electrochromic device 200 according to the subject matter disclosed herein for a high-transmission state and a low-transmission state. In FIG. 2, electrochromic device 200 comprises a substrate 201, one or more lower layers 202, an absorbing (or absorber) electrochromic layer 203, and a target layer 204. In one exemplary embodiment, target layer 204 is a transparent conductive oxide (TCO). When variable absorbing layer 203 is in a high-transmission state 210 (i.e., a bleached state, as depicted on the left side of FIG. 2), laser light 205 is transmitted through electrochromic device 200. When electrochromic device 200 is in a low-transmission state 220 (i.e., a darkened state, as depicted on the right side of FIG. 2), laser light 205 is not transmitted through electrochromic device 200, but is absorbed by absorbing electrochromic layer 203.

Thus, when absorbing electrochromic layer 203 is in a darkened state, incident laser light 205 is absorbed by absorbing electrochromic layer 203, thereby preventing laser light energy from being incident on underlying layers 202 and substrate 201. Additionally, for the case the low-transmission state, as the absorbing electrochromic layer 203 absorbs energy, the temperature realized for a given amount of incident energy is greater because the energy is concentrated in a smaller area.

Figure 3:
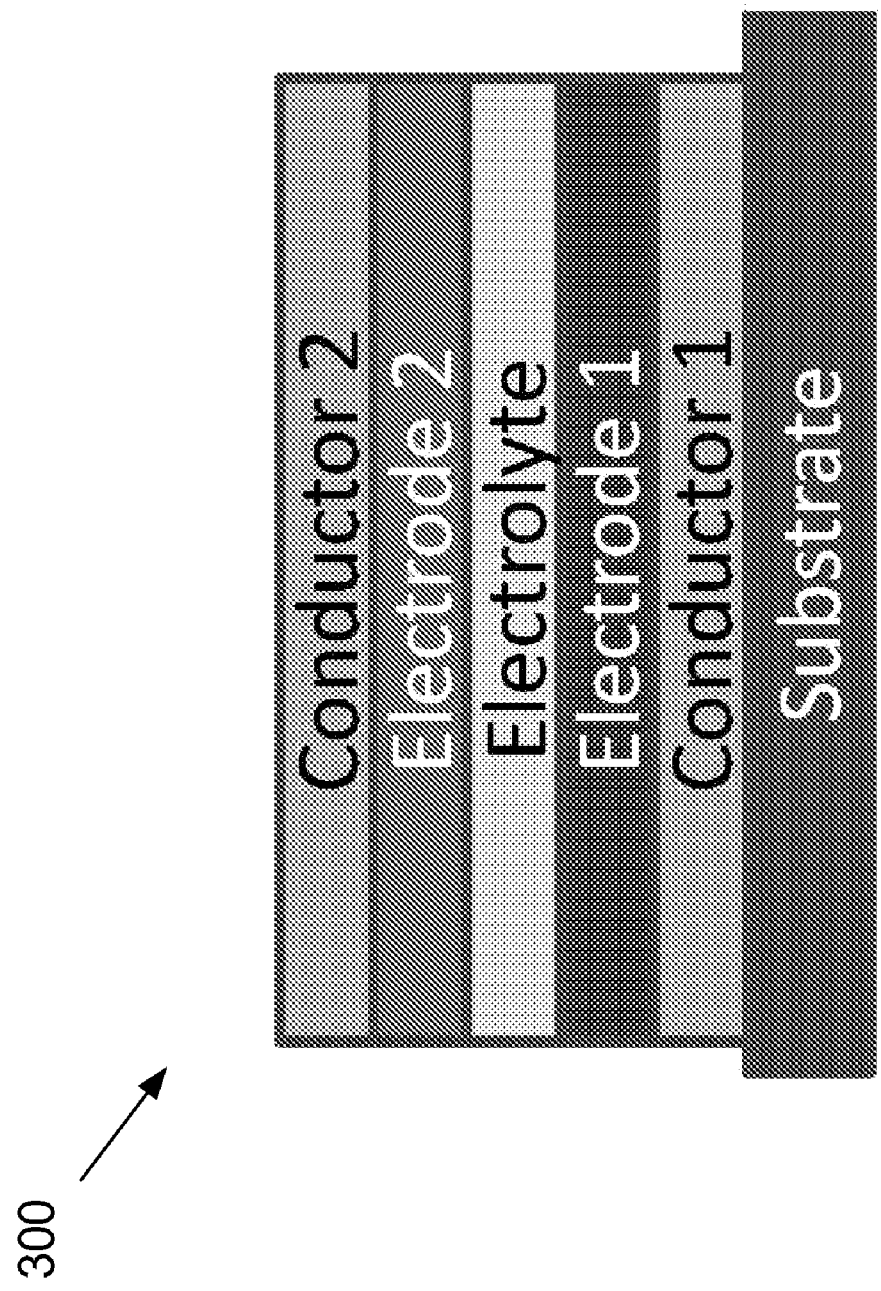
FIG. 3 depicts a cross-sectional schematic diagram of an exemplary electrochromic device that is configured to have an absorbing electrochromic layer that is suitable for patterning according to the subject matter disclosed herein.

FIG. 3 depicts a cross-sectional schematic diagram of an exemplary electrochromic device 300 that is configured to have an absorbing electrochromic layer that is suitable for patterning according to the subject matter disclosed herein. Electrochromic device 300 comprises conductors 1 and 2, electrodes 1 and 2, and an electrolyte. Conductors 1 and 2 are selected from the following exemplary transparent conductive materials that include indium tin oxide (ITO), fluorine-doped tin oxide (FTO), antimony-doped tin oxide, aluminum-doped zinc oxide, and fluorine-doped zinc oxide. Conductors 1 and 2 can be selected to be the same material or can be different materials. Electrodes 1 and 2, as a pair, are selected so that one is a cathodic and/or electrochrome material, and the other is an anodic and/or electrochrome material. Electrode 2 must be an electrochromic material in order to make the device relevant for the patterning technique disclosed herein. Suitable cathodic and/or electrochrome materials include tungsten oxide $WO_3$, molybdenum oxide $MoO_3$, niobium oxide $Nb_2O_3$, among others, and should be reduced by intercalation with a mobile ion such as Li+, H+, or Na+ in order to be absorbing. Suitable anodic and/or electrochrome materials include nickel oxide $NiO_x$, tungsten-doped nickel oxide NiWO, vanadium oxide $V_2O_5$, among others, and these materials must be made devoid of intercalation ions in order to act as the absorbing layer. Suitable electrolyte materials include tantalum oxide $Ta_2O_5$, silica dioxide $SiO_2$, aluminum oxide $Al_2O_3$, and titanium oxide $TiO_2$. Thus, there are a number of suitable combinations of materials that can be selected to form the five primary layers of an electrochromic device that can be patterned in accordance with the subject matter disclosed herein. One exemplary embodiment comprises a first conductor formed from fluorine-doped tin oxide (FTO), a first electrode formed from tungsten oxide $WO_3$, an electrolyte formed from tantalum oxide $Ta_2O_5$ or silicon dioxide $SiO_2$, a second electrode formed from tungsten-doped nickel oxide, and a second conductor formed from indium tin oxide (ITO).

Figure 4:
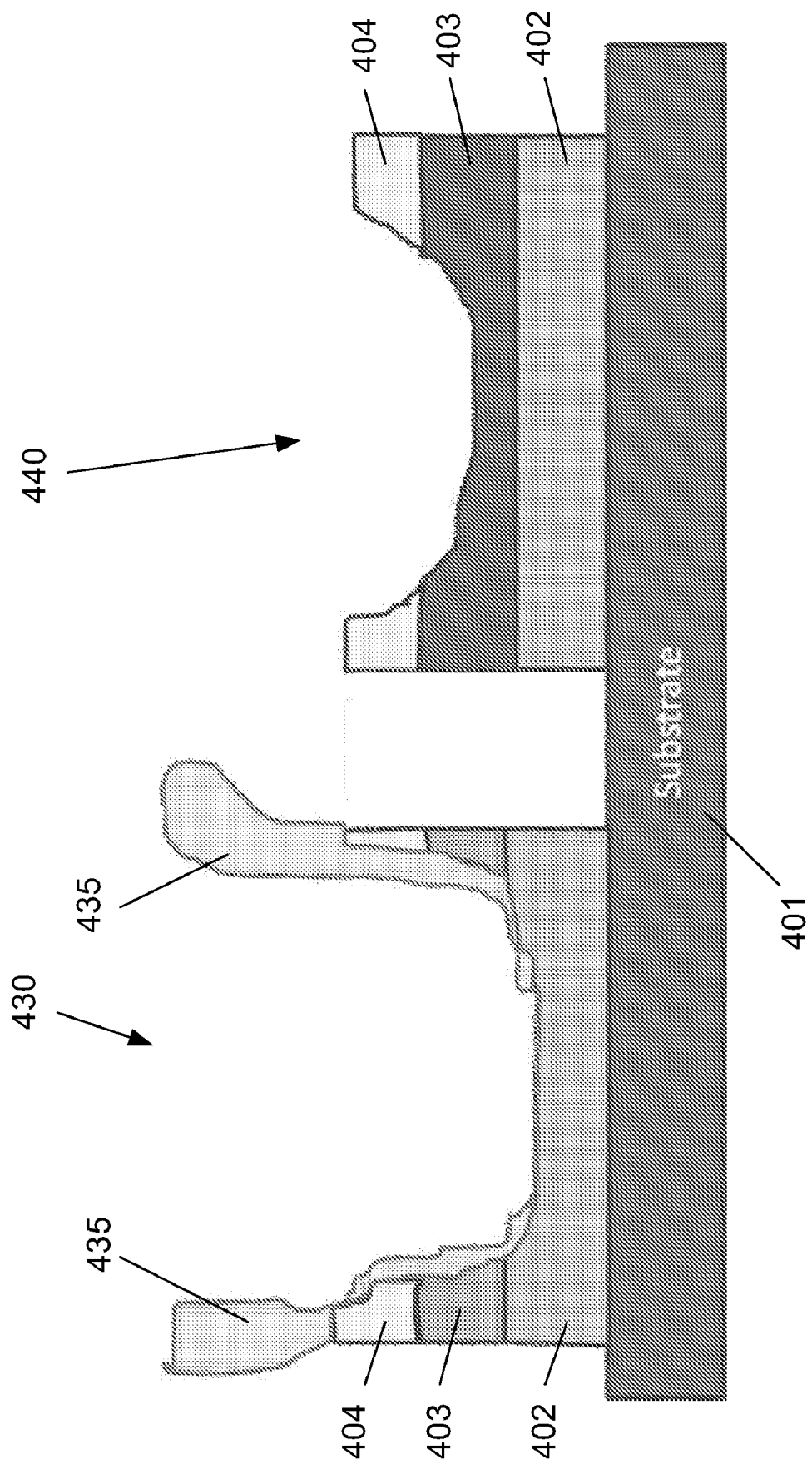
FIG. 4 depicts a cross-sectional elevation schematic view of a laser ablation scribe line of two portions of an exemplary embodiment of an electrochromic device according to the subject matter disclosed herein for a high-transmission state and a low-transmission state.
Figure 5:
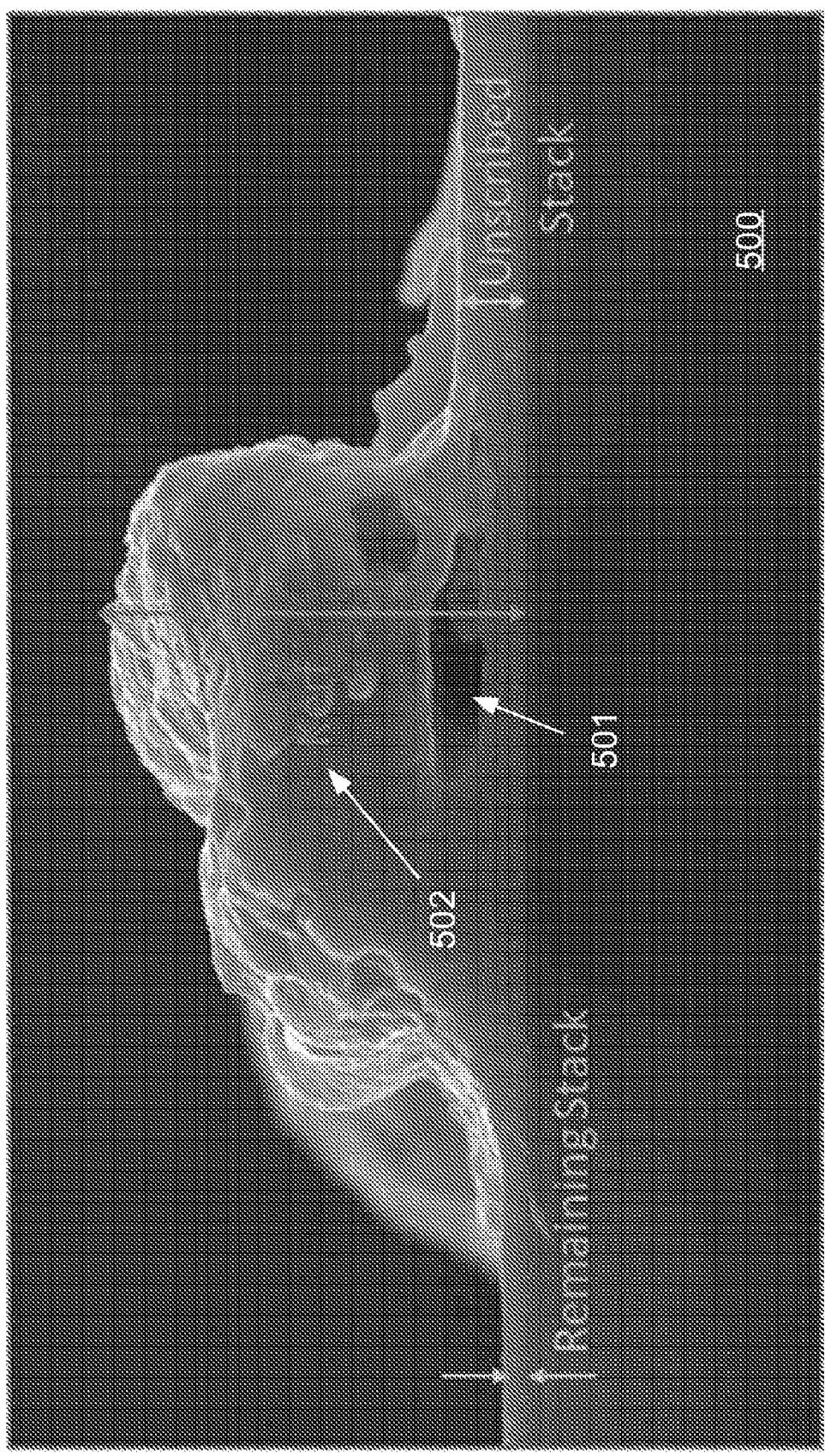
FIG. 5 is an electron micrograph of a cross-sectional view of an exemplary electrochromic device in which the pictured electrochromic device corresponds to the left side of FIG. 3.

FIG. 4 depicts a cross-sectional elevation schematic view of a laser ablation scribe line of two portions of an exemplary embodiment of an electrochromic device 400 according to the subject matter disclosed herein for a high-transmission state and a low-transmission state. In FIG. 4, electrochromic device 400 comprises a substrate 401, one or more lower layers 402, an absorbing electrochromic layer 403, and a target layer 404. In one exemplary embodiment, target layer 404 is a transparent conductive oxide (TCO). On the left side of FIG. 4, a laser-ablation scribe line 430 is depicted in which the incident laser light fluence was sufficient to ablate target layer 404. Because there was transmitted energy through electrochromic device 400, the incident laser light also had sufficient energy to melt layers 402 and 403 below target layer 404. The violent thermal vaporization of the target layer 404 and thermal expansion of the underlying layers 402 and 403 cause the melt to push out of the trough of laser-ablation scribe line 430 and form slag (or kerf) 435. Additionally, there may be cavitations (not shown) in kerf 435 that contributes to kerf 435 further expanding and pushing out of the trough. The cavities may remain after the melt re-solidifies, as shown in FIG. 5 by cavity 501. FIG. 5, in particular, is an electron micrograph of a cross-sectional view of an exemplary electrochromic device 500 in which the left side of electrochromic device 500 corresponds to the left side of FIG. 4. A cavity 501 is shown in kerf 502. Additionally, the change in density and the intermixing of materials from the various layers of an electrochromic a stack make kerf undesirable.

On the right side of FIG. 4, a laser-ablation scribe line 440 is depicted in which the incident laser light fluence was a lower fluence than for scribe line 430 because layer 303 sufficiently absorbed the lower laser fluence, thereby ablating target layer 404, which lies over the top of layer 403. To ablate layer 404 by itself would require a higher laser fluence because the absorption coefficient for layer 404 is very low at the laser wavelength. In this case, however, absorbing electrochromic layer 403 protects lower layers 402, as well as transfers heat to target layer 404. Laser-ablation scribe line 440 requires significantly less energy than laser-ablation scribe line 430, and produces significantly less kerf, if any kerf is produced at all.

Figure 6:
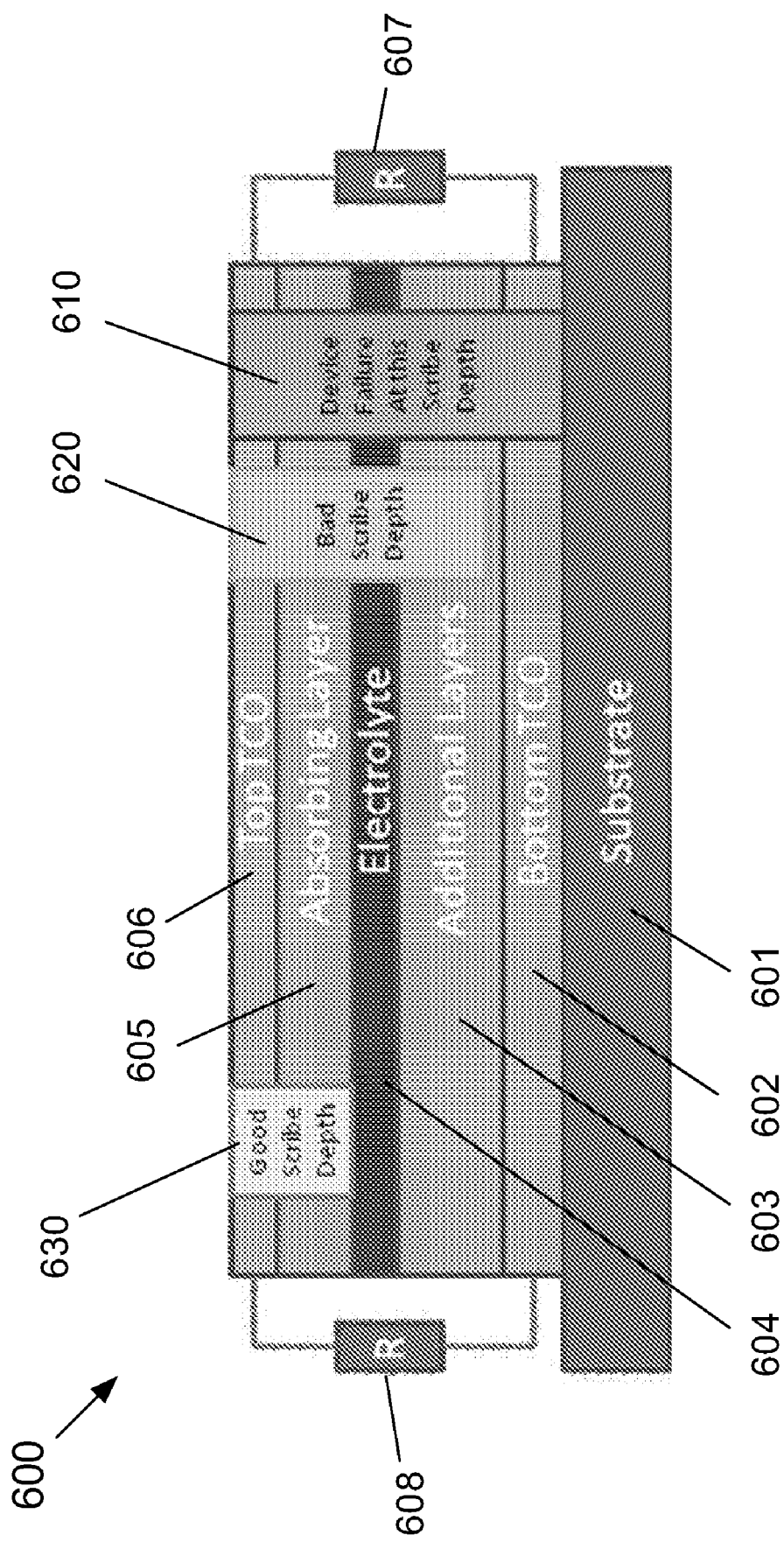
FIG. 6 provides a pictorial summary of the benefits of the subject matter disclosed herein.

FIG. 6 provides a pictorial summary of the subject matter disclosed herein in contrast with previous patterning techniques. In particular, FIG. 6 depicts a cross-sectional view of an exemplary embodiment of an electrochromic device 600 in which three laser-ablation scribe lines 610, 620 and 630 are shown. Each laser-ablation scribe line is formed by a different technique with the intention of scribing the top transparent conductive oxide (TCO) layer (i.e., the target layer). Electrochromic device 600 comprises a substrate 601, a bottom transparent conductive oxide (TCO) 602, one or more additional layers 603, an electrolyte layer 604, an absorbing layer 605 and a top transparent conductive oxide (TCO) 606.

Laser-ablation scribe line 610 represents a scribe line that is formed using a technique that utilizes a laser having sufficient fluence to ablate completely through all layers of electrochromic device 600. Such a technique results in failure of electrochromic device 600 because the scribe interrupts the conductivity of both conductors.

Laser-ablation scribe line 620 represents a scribe line that is formed when electrochromic device is in a bleached state and the laser light is transmitted to lower layers of electrochromic device 600. The fluence of the laser light is less than that used for scribe line 610, but the fact that the laser light is transmitted to layers below target layer 606, scribe line 620 cuts across electrolyte layer 604, which is the highest resistance layer. Any conductive melt (kerf) from top transparent conductive layer 606 that spans the high resistance electrolyte layer 604 greatly reduces the resistance of the electrochromic device and, consequently, the efficiency of the electrochromic device. Thus, a new low-resistance short has been established in the effort to isolate resistor 607. Scribe line 620 corresponds to scribe line 430 in FIG. 4 and the scribe line shown on the left side of FIG. 5. For this case, resistor 607 represents an unpredictable edge resistor for scribe line 620, and/or a short between the target layer and bottom TCO layer 602.

Laser-ablation scribe line 630 is formed in accordance with the subject matter disclosed herein. The ablation target layer 606 (top transparent conductive oxide (TCO) 606 in exemplary electrochromic device 600) is semi-transparent to the wavelength of the laser used. By increasing the absorption of a layer underneath the target layer in the electrochromic stack, the temperature-to-fluence efficiency is increased; and the fluence needed for laser ablation is decreased, thereby protecting underlying layers from damage. There is no rule of thumb; however, the ablation of a material requires a specific minimum temperature. Energy absorbed is based on the transparency and reflectivity of the material to be ablated as well as the incident energy from the laser source. The temperature is dependent on the energy absorbed as defined by the following equation of energy (simplified for the relevant physical system):

$$\rho C_p \left( \frac{\partial T}{\partial t} \right) = \nabla(K\nabla T) + Q_{ab} \tag{1}$$

in which $\rho$ is the density of the film, $C_p$ is the constant pressure heat capacity of the material, K is the thermal conductivity, and $Q_{ab}$ is a term that represents the energy of absorption. Minimizing the incidence of energy on the underlying layers also produces a higher quality laser scribe line with less eject, kerf, and scribe dimension variation. Resistor 608 represents a predictable edge resistance that is associated with scribe line 630.

The electrochromic material layer that is closest to the incident laser light is the absorbing layer of the electrochromic device. Laser ablation is carried out when the electrochromic device is in its darkened state. Several different techniques can be used for placing the electrochromic device in its darkened state. In exemplary embodiment, the electrochromic device is placed in the darkened state using an electronic controller that applies appropriate control voltages to the electrochromic device. In another exemplary embodiment, the darkened state is obtained by employing dark-state deposition. That is, the electrochromic device is manufactured in the darkened state and laser ablation is performed without switching the state of the device. For anodic materials the dark state is the default state of deposition. A third exemplary embodiment provides that an electrochromic device is produced that is in its darkened state in its relaxed or equilibrium state.

Although the foregoing disclosed subject matter has been described in some detail for purposes of clarity of understanding, it will be apparent that certain changes and modifications may be practiced that are within the scope of the appended claims. Accordingly, the present embodiments are to be considered as illustrative and not restrictive, and the subject matter disclosed herein is not to be limited to the details given herein, but may be modified within the scope and equivalents of the appended claims.

What is claimed is:

1. A method, comprising:
   providing an electrochromic device comprising a target layer, an absorbing electrochromic layer formed below the target layer, and an electrolyte layer formed below the absorbing electrochromic layer, the absorbing electrochromic layer being in a darkened state;
   laser ablating the target layer using light comprising a wavelength that is transmitted through the target layer and comprising a fluence level that does not ablate layers of the electrochromic device that are below the absorbing electrochromic layer.

2. The method according to claim 1, wherein the target layer comprises a transparent conductive layer.

3. The method according to claim 1, wherein the electrolyte layer formed below the target layer comprises an electrochromic material.

4. The method according to claim 3, wherein the electrochromic material comprises at least one of tungsten oxide $WO_3$, molybdenum oxide $MoO_3$, and niobium oxide $Nb_2O_3$.

5. The method according to claim 3, wherein the electrochromic material comprises at least one of nickel oxide $NiO_X$, tungsten-doped nickel oxide NiWO, and vanadium oxide $V_2O_5$.

6. The method according to claim 3, further comprising placing the absorbing electrochromic layer in the darkened state by applying a predetermined control voltage to the electrochromic device.

7. The method according to claim 3, further comprising placing the absorbing electrochromic layer in the darkened state by employing dark-state deposition.

8. The method according to claim 3, further comprising placing the absorbing electrochromic layer in the darkened state by producing the electrochromic device to be in its darkened state in an equilibrium state.

9. The method according to claim 1, wherein the electrochromic device comprises a window.

10. An electrochromic device formed by a method, comprising:
providing an electrochromic device comprising a target layer, an absorbing electrochromic layer formed below the target layer, and an electrolyte layer formed below the absorbing electrochromic layer, the absorbing electrochromic layer being in a darkened state;
laser ablating the target layer using light comprising a wavelength that is transmitted through the target layer and comprising a fluence level that does not ablate layers of the electrochromic device that are below the absorbing electrochromic layer.

11. The electrochromic device according to claim 10, wherein the target layer comprises a transparent conductive layer.

12. The electrochromic device according to claim 10, wherein the electrolyte layer formed below the target layer comprises an electrochromic material.

13. The electrochromic device according to claim 12, wherein the electrochromic material comprises at least one of tungsten oxide $WO_3$, molybdenum oxide $MoO_3$, and niobium oxide $Nb_2O_3$.

14. The electrochromic device according to claim 12, wherein the electrochromic material at least one of nickel oxide $NiO_X$, tungsten-doped nickel oxide NiWO, and vanadium oxide $V_2O_5$.

15. The electrochromic device according to claim 12, wherein the method forming the electrochromic device further comprises placing the absorbing electrochromic layer in the darkened state by applying a predetermined control voltage to the electrochromic device.

16. The electrochromic device according to claim 12, wherein the method forming the electrochromic device further comprises placing the absorbing electrochromic layer in the darkened state by employing dark-state deposition.

17. The electrochromic device according to claim 12, wherein the method forming the electrochromic device further comprises placing the absorbing electrochromic layer in the darkened state by producing the electrochromic device to be in its darkened state in an equilibrium state.

18. The electrochromic device according to claim 10, wherein the electrochromic device comprises a window.

\* \* \* \* \*